(No Model.)
J. G. LANDMAN.
REEL FASTENER FOR FISHING RODS.
No. 434,793. Patented Aug. 19, 1890.
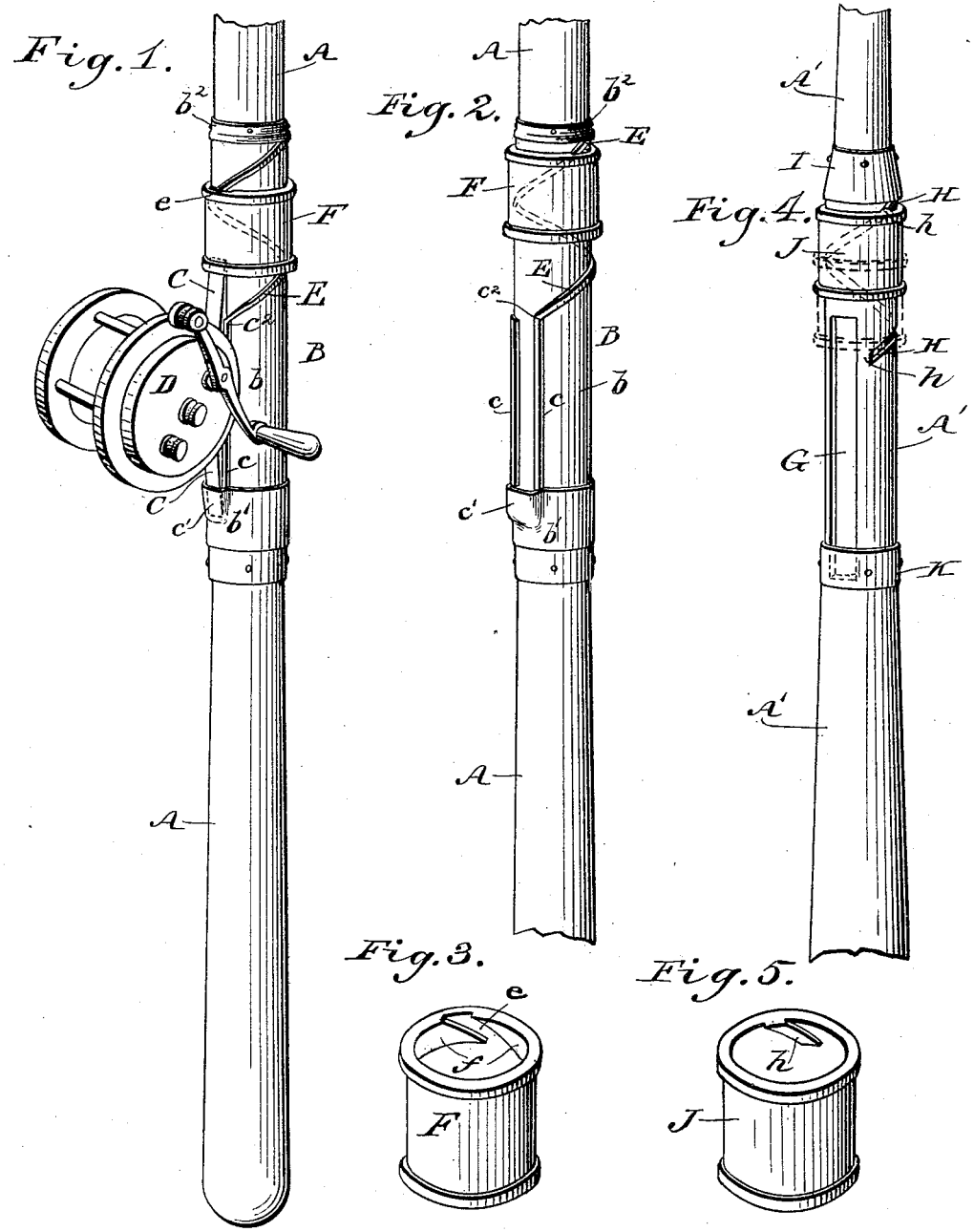
WITNESSES:
INVENTOR:
J. G. Landman
BY Munn & Co.
ATTORNEYS

UNITED STATES PATENT OFFICE.

JOHN G. LANDMAN, OF BROOKLYN, NEW YORK.

REEL-FASTENER FOR FISHING-RODS.

SPECIFICATION forming part of Letters Patent No. 434,793, dated August 19, 1890.

Application filed December 13, 1889. Serial No. 333,618. (No model.)

*To all whom it may concern:*

Be it known that I, JOHN G. LANDMAN, of Brooklyn, in the county of Kings and State of New York, have invented a new and Improved Reel-Fastening for Fishing-Rods, of which the following is a full, clear, and exact description.

My invention relates to fishing-rods and reels therefor, and has for its object to provide a simple, inexpensive, and efficient fastening by which the reel may be quickly, easily, and securely attached to the rod or may be detached therefrom, as required.

The invention consists in certain novel features of construction of the reel-fastening, all as hereinafter described and claimed.

Reference is to be had to the accompanying drawings, forming a part of this specification, in which similar letters of reference indicate corresponding parts in all the figures.

Figure 1 is a perspective view of the butt of a fishing-rod with a reel held thereto in accordance with my invention. Fig. 2 is a perspective view of the rod and its metal ferrule or sleeve with the reel removed. Fig. 3 is a perspective view of the fastening-nut or screw-sleeve removed from the rod and drawn to a larger scale. Fig. 4 shows a modification, in which a recessed and spirally-grooved fishing-rod not provided with a long ferrule or sleeve is adapted, with a screw-nut, to fasten the reel to it; and Fig. 5 is an enlarged perspective view of the fastening-nut shown in Fig. 4, but removed from the rod.

I will first particularly describe the invention with reference to Figs. 1, 2, and 3 of the drawings, which show a bamboo or wooden fishing-rod A, provided with a long metal ferrule B, which fits the butt-end of the rod and is preferably made in three pieces—a long center piece $b$, a back end piece $b'$, and an outer or front narrow collar $b^2$. On the body or central part $b$ of the sleeve B are produced or fixed a couple of parallel ribs or flanges $c$ $c$, and in the outer part or end of the part $b'$ is formed a socket $c'$, which receives the back end of the attaching-plate C, to which the reel D is fixed, while this plate lies snugly between the two parallel ribs $c$ $c$, above mentioned. On the outer portion of the center part $b$ of the sleeve B is secured a spiral flange E which forms a screw-thread of quite sharp pitch, and to which is fitted a fastening-nut F, which has an interior flange or rib portion $f$, provided with an inclined groove $e$, which fits the screw-flange E and causes the nut when turned to traverse the ferrule. The lower part of the nut F is adapted to overlock the outer end of the reel-attaching plate C to lock or fasten the reel to the fishing-rod. The spiral or screw flange E extends, preferably, from the upper or outer end of one of the ferrule ribs or flanges $c$ clear to the outer end of the body portion $b$ of the ferrule. The back part $b'$ of the ferrule, when slipped onto the rod, is pinned fast, and the main part $b$ is then slipped into the part $b'$, which forms a stop to it, and after the fastening-nut F is screwed onto the spiral rib or thread E the collar $b^2$ is slipped onto the rod and back to the ferrule part $b$, which it overhangs a little to form a stop to prevent forward slipping of the nut from the ferrule after the collar is pinned fast to the rod. With this construction it is manifest that after the nut F is turned outward toward the ferrule-collar $b^2$ sufficiently to allow the reel-plate C to be placed into the socket $c'$ and between the ribs or flanges $c$ $c$ the nut may be turned backward again until it overlocks the outer end of the reel-plate C to quickly and securely fasten the reel to the fishing-rod, as shown in Fig. 1 of the drawings.

As above described, the invention is adapted to detachably fasten a reel to a bamboo or wooden fishing-rod, which requires a metal ferrule for the purpose; but when the fishing-rod butt is made of metal, hard rubber, or of any other material into which a durable spiral groove or screw-thread may be cut I prefer to carry out the invention as represented in Figs. 4 and 5 of the drawings. In this case a socket G is cut or molded into the fishing-rod butt A' to receive the reel-fastening plate C, and a spiral groove or screw-thread H is cut into the rod beyond this socket to a point where a collar I is pinned to the rod after a fastening-nut J, having an inclined rib $h$, entering the groove H, is slipped onto the butt. A plate or collar K, pinned to the rod so as to overlap the outer or back end portion of the socket or recess G, will retain the back end of the reel-plate C placed in the socket, while its forward end will be overlocked and retained by the nut J when it is turned or screwed back to the position indicated by the dotted lines in Fig. 4 of the drawings, as will readily be understood.

It is manifestly desirable to provide a stop which will prevent disengagement of the nut F or J from the spiral thread or groove at a point next the reel-plate-retaining seat or opening of the rod. I accomplish this by providing a lug at the outer end of the thread or groove, and this lug is preferably either the outer part $c^2$ of the adjacent rib $c$ of the reel-plate socket of the metal ferrule B, as shown in Figs. 1 and 2 of the drawings, or a portion $h$ of the body of the solid rod at the outer end of the spiral groove H, and shown between it and the reel-plate socket G in Fig. 4 of the drawings. In either case the nut-stop is formed by a portion of the side wall of the reel-plate seat or socket.

Having thus fully described my invention, I claim as new and desire to secure by Letters Patent—

1. In a reel-fastening for fishing-rods, the combination, with a rod having a seat for retaining the reel-attaching plate, and provided also with a spiral thread or groove, of a nut on the rod adapted to the thread or groove and to the reel-plate, and a stop preventing disengagement of the nut from the spiral thread or groove next the reel-plate seat or socket, substantially as herein set forth.

2. In a reel-fastening for fishing-rods, the combination, with a rod having a seat for retaining the reel-attaching plate, and provided also with a spiral thread or groove, of a nut on the rod adapted to the thread or groove and to the reel-plate, and a stop preventing disengagement of the nut from the spiral thread or groove next the reel-plate seat or opening and consisting of a portion of the side wall of said seat or socket, substantially as herein set forth.

JOHN G. LANDMAN.

Witnesses:
JOHN S. WRIGHT,
E. A. MOREHOUSE.